United States Patent [19]

Kahle

[11] Patent Number: 5,748,938

[45] Date of Patent: May 5, 1998

[54] SYSTEM AND METHOD FOR MAINTAINING COHERENCY OF INFORMATION TRANSFERRED BETWEEN MULTIPLE DEVICES

[75] Inventor: James Allan Kahle, Austin, Tex.

[73] Assignee: International Business Machines Corporation, Armonk, N.Y.

[21] Appl. No.: 350,399

[22] Filed: Dec. 6, 1994

Related U.S. Application Data

[63] Continuation of Ser. No. 61,785, May 14, 1993, abandoned.

[51] Int. Cl.$^6$ .................................................. G06F 13/00
[52] U.S. Cl. ................................. 395/465; 395/445
[58] Field of Search ........................... 395/473, 290, 395/465, 468, 445

[56] References Cited

U.S. PATENT DOCUMENTS

| | | | |
|---|---|---|---|
| 4,136,386 | 1/1979 | Annunziata et al. | 364/200 |
| 4,958,351 | 9/1990 | Flora et al. | 371/40.1 |
| 4,977,498 | 12/1990 | Rastegar et al. | 364/200 |
| 5,043,886 | 8/1991 | Witek et al. | 364/200 |
| 5,091,850 | 2/1992 | Culley | 395/400 |
| 5,191,649 | 3/1993 | Cadambi et al. | 395/200 |
| 5,241,664 | 8/1993 | Ohba et al. | 395/425 |
| 5,287,537 | 2/1994 | Newmark et al. | 395/800 |
| 5,297,269 | 3/1994 | Donaldson et al. | 395/490 |
| 5,355,467 | 10/1994 | MacWilliams et al. | 395/425 |
| 5,517,626 | 5/1996 | Archer et al. | 395/290 |
| 5,528,764 | 6/1996 | Heil | 395/293 |

FOREIGN PATENT DOCUMENTS

| | | |
|---|---|---|
| 432524A2 | 11/1990 | European Pat. Off. . |
| 435475A2 | 11/1990 | European Pat. Off. . |
| 2256512 | 4/1992 | United Kingdom . |

OTHER PUBLICATIONS

*IBM Technical Disclosure Bulletin*, vol. 33, No. 2, Jul. 1990, "Reduction of of Cache Coherence Traffic in MP Systems Via Large Block Authority", pp. 398–406.

*IBM Technical Disclosure Bulletin*, vol. 26, No. 8, Jan. 1984, "Bin in Transit Mechanism", pp. 4153–4155.

*IBM Technical Disclosure Bulletin*, vol. 26, No. 7B, Dec. 1983, "Sequential Staging Control", pp. 3817–3819.

*IBM Technical Disclosure Bulletin*, vol. 27, No. 8, Jan. 1985, "Caching and Recovery of Catalog Information in Distributed Query Compilation", pp. 4795–4797.

*IBM Technical Disclosure Bulletin*, vol. 31, No. 7, Dec. 1988, "Mechanism for Emulating a Tagged Memory Computer System", pp. 429–430.

*IBM Technical Disclosure Bulletin*, vol. 25, No. 10, Mar. 1983, "Partial Track Staging", pp. 5008–5009.

*Computer 1990 IEEE*, "A Survey of Cache Coherence Schemes for Multiprocessors", Per Stenstrom, Lund University, pp. 12–24.

Performance Semiconductor Corporation, Performance Semiconductor PR4000 Microprocessor Users Manual, MIPS R4000 Users Manual, pp. 11–1 through 11–34.

*Primary Examiner*—David L. Robertson
*Attorney, Agent, or Firm*—Michael A. Davis, Jr.

[57] ABSTRACT

A method and system are provided for maintaining memory coherency. A first device stores information. A second device is coupled to the first device. The second device inputs at least a portion of the information and outputs an indication that the portion is not to be cached by the second device. Rather than initializing other devices to "know" in advance that a cache memory is absent from a given device, a control signal indicates the device's intent to not cache the requested portion of information in a cache memory.

17 Claims, 2 Drawing Sheets

SYSTEM AND METHOD FOR MAINTAINING COHERENCY OF INFORMATION TRANSFERRED BETWEEN MULTIPLE DEVICES

This is a continuation of application Ser. No. 08/061,785 filed May 14, 1993, now abandoned.

TECHNICAL FIELD OF THE INVENTION

This patent application relates in general to systems for processing information and in particular to a method and system for maintaining memory coherency.

BACKGROUND OF THE INVENTION

A system for processing information can include a system memory. Moreover, one or more devices of the system can include a cache memory. A cache memory is a relatively small high-speed memory that stores a copy of information from one or more portions of the system memory. Frequently, the cache memory is physically distinct from the system memory. Each device manages the state of its respective cache memory.

A device can copy information from a portion of the system memory into the device's cache memory. The device can modify information in its cache memory. Further, the device can copy modified information from its cache memory back to a portion of the system memory.

In a coherent memory system, all devices operate in response to the most recent version of information for the system memory. Such coherency allows synchronization, cooperative use of shared resources, and task migration among the devices. For maintaining memory coherency, the devices communicate status indications to one another through a system bus. Such status indications add traffic through the system bus. The added traffic is significant where a first device frequently modifies information for the system memory while a second device frequently attempts to input the information. By adding traffic through the system bus, overall performance of the system is degraded.

Thus, a need has arisen for a method and system for maintaining memory coherency, in which traffic through the system bus is diminished relative to previous techniques. Also, a need has arisen for a method and system for maintaining memory coherency, in which overall performance of the system is improved.

SUMMARY OF THE INVENTION

In a method and system for maintaining memory coherency, a first device stores information. A second device is coupled to the first device. The second device inputs at least a portion of the information and outputs an indication that the portion is not to be cached by the second device.

It is a technical advantage of the present invention that traffic through a system bus is diminished relative to previous techniques.

It is another technical advantage of the present invention that overall performance of the system is improved.

BRIEF DESCRIPTION OF THE DRAWINGS

An exemplary embodiment of the present invention and its advantages are better understood by referring to the following descriptions and accompanying drawings, in which.

DETAILED DESCRIPTION

Figure 1:
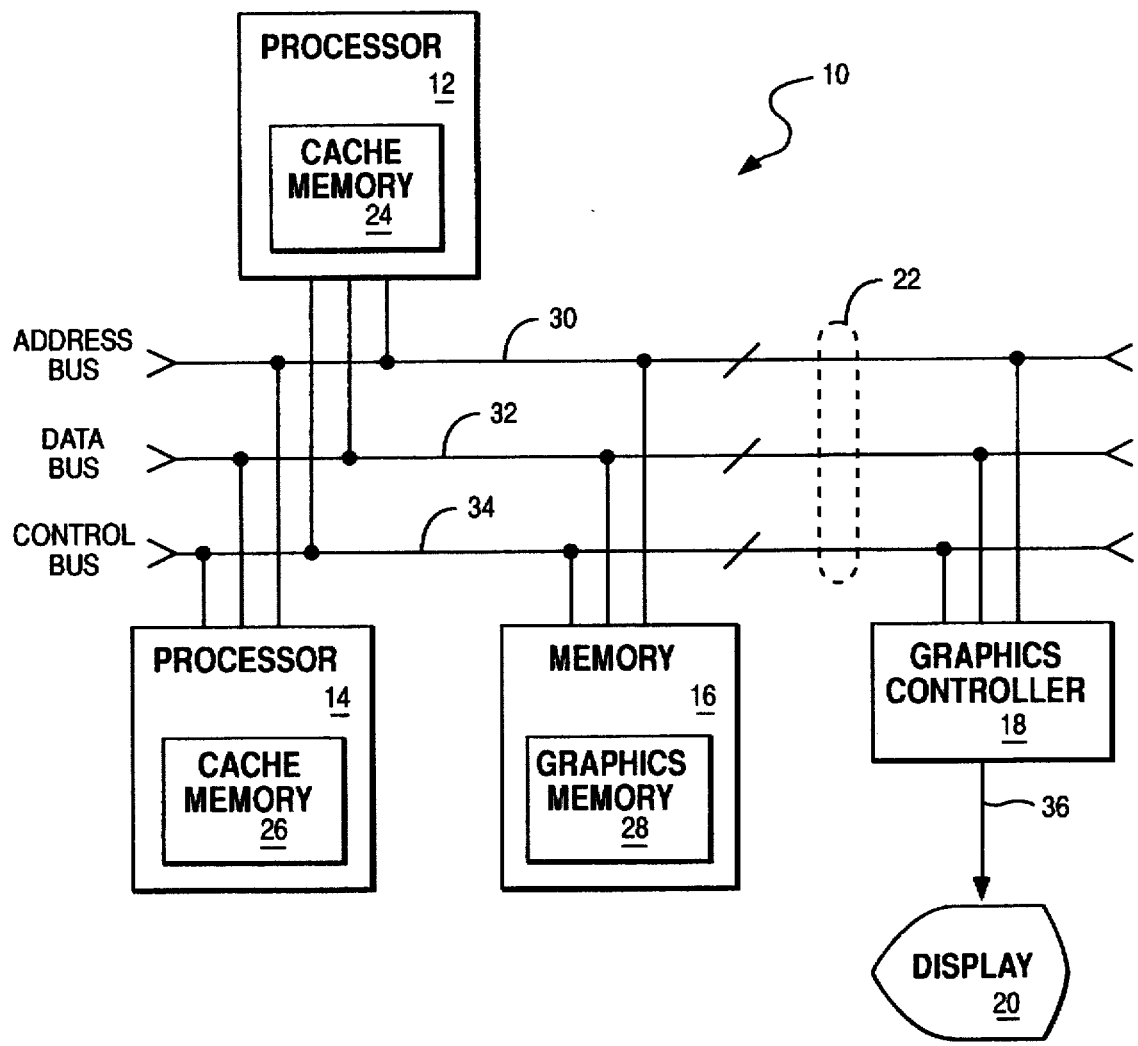
FIG. 1 is a block diagram of an exemplary system for processing information.
Figure 2:
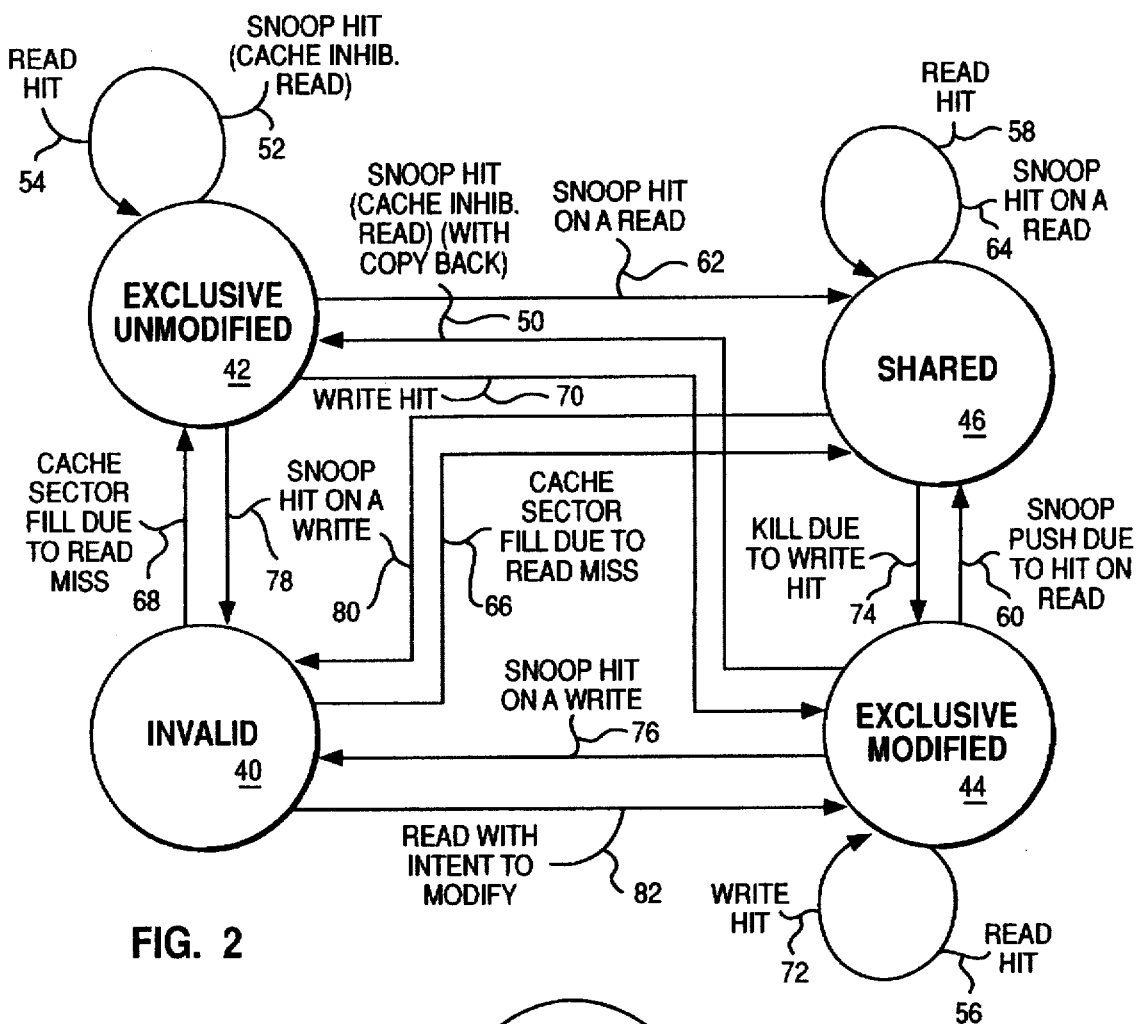
FIG. 2 is a state diagram of a technique for maintaining memory coherency according to a first exemplary embodiment of the present invention.
Figure 3:
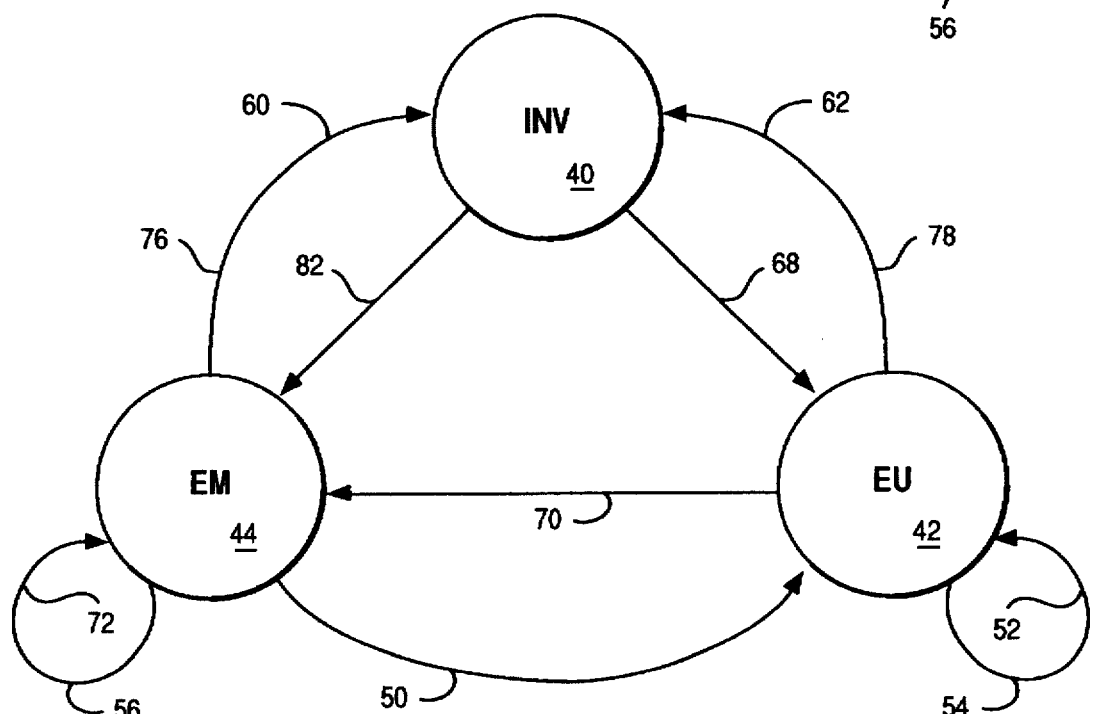
FIG. 3 is a state diagram of a technique for maintaining memory coherency according to a second exemplary embodiment of the present invention.

An exemplary embodiment of the present invention and its advantages are better understood by referring to FIGS. 1-3 of the drawings, like numerals being used for like and corresponding parts of the accompanying drawings.

FIG. 1 is a block diagram of an exemplary system, indicated generally at 10, for processing information. System 10 includes hardware devices, namely a processor 12, a processor 14, a system memory 16, a graphics controller 18, and a display 20. Each of the hardware devices includes respective electronic circuitry. Moreover, system 10 includes a system bus 22.

In an exemplary embodiment, processor 12 is an integrated circuit. Accordingly, processor 12 includes a cache memory 24 integral with processor 12. Also, processor 14 includes a cache memory 26. Together, one or more portions of memory 16 form a graphics memory section 28.

System bus 22 includes an address bus 30, a data bus 32, and a control bus 34. Each of processor 12, processor 14, memory 16 and graphics controller 18 is connected to address bus 30, to data bus 32, and to control bus 34. Further, graphics controller 18 is connected to display 20 through an information path 36.

Cache memory 24 and cache memory 26 are relatively small high-speed memories that store copies of information from one or more portions of memory 16. For example, processor 12 is able to copy (i.e. input) information from a portion of memory 16 into cache memory 24. Moreover, processor 12 is able to modify information in cache memory 24. Further, processor 12 is able to copy (i.e. output) modified information from cache memory 24 back to memory 16.

System 10 is a coherent memory system, in which all devices of system 10 operate in response to the most recent version of information for memory 16. In such a shared memory system, information from a portion of memory 16 is "owned" by one or more of the multiple devices. The devices cooperate to maintain coherency of the shared information. In order to modify information, a device acquires exclusive ownership of the information.

In an exemplary operation, processor 12 outputs (through system bus 22) a request to copy information from a portion of memory 16. The request is specified by a signal on control bus 34. The portion of memory 16 is specified by an address on address bus 30. As another device with a cache memory, processor 14 responds to such a request by snooping cache memory 26 to determine whether cache memory 26 has a copy of information for the addressed portion of memory 16. If processor 14 has a copy of such information, then processor 14 returns a status (specified by a signal on control bus 34) to processor 12.

This returned status from processor 14 can include a retry request for requesting processor 12 to later retry outputting its request to copy information from memory 16. The retry request indicates to processor 12 that cache memory 26 of processor 14 has a modified copy of information for the addressed portion. By requesting processor 12 to later retry outputting its request to copy information, processor 14 has an opportunity to copy the modified information back to the addressed portion of memory 16. Processor 14 copies the information back to memory 16 by specifying the modified information on data bus 32 and by specifying the portion of memory 16 on address bus 30.

After processor 14 copies the modified information back to the addressed portion of memory 16, processor 12 again outputs its request to copy information from the portion of memory 16. In such a situation, processor 14 does not return a retry request, because the information in cache memory 26 is no longer modified relative to the information actually stored in the addressed portion of memory 16. In that case, processor 12 successfully reads (i.e. inputs) the information from the addressed portion of memory 16.

In this manner, memory 16 is shared by processors 12 and 14. Similarly, graphics memory 18 is shared by graphics controller 18 and processors 12 and 14. Graphics controller 18 periodically reads information from graphics memory 28. In response to information from graphics memory 28, graphics controller 18 outputs signals to display 20 through information path 36. In response to such signals from graphics controller 18, display 20 displays a graphics image. Processors 12 and 14 are able to modify information in graphics memory 28, so that the graphics image displayed by display 20 is modified.

FIG. 2 is a state diagram of a technique for maintaining memory coherency according to a first exemplary embodiment of the present invention. The coherency technique of FIG. 2 is an improved modified-exclusive-shared-invalid ("MESI") technique. Accordingly, FIG. 2 shows an invalid ("INV") state 40, an exclusive unmodified ("EU") state 42, an exclusive modified ("EM") state 44, and a shared state 46.

In a significant aspect of the first exemplary embodiment, the MESI technique of FIG. 2 is improved to include:

- a "snoop hit (cache inhibited read)(with copyback)" state transition path 50 from exclusive modified state 44 to exclusive unmodified state 42; and
- a self-looping "snoop hit (cache inhibited read)" state transition path 52 at exclusive unmodified state 42.

In the first exemplary embodiment, each of processors 12 and 14 maintains memory coherency in the same manner, according to the technique of FIG. 2. Notably, electronic circuitry of processors 12 and 14 automatically operates according to the memory coherency technique of FIG. 2, so that software programming of processors 12 and 14 is not needed for memory coherency. Accordingly, the maintenance of memory coherency is transparent to software programs executed by processors 12 and 14.

For example, processor 12 is able to execute a LOAD operation for reading information from a portion of memory 16. If a copy of such information is already stored in cache memory 24 in exclusive unmodified state 42, then processor 12 automatically reads the information from cache memory 24, which is faster than reading the information from memory 16 through system bus 22. After reading the information from cache memory 24, the information remains stored in cache memory 24 in exclusive unmodified state 42, as indicated by a self-looping "read hit" state transition path 54 at exclusive unmodified state 42.

Similarly, if a copy of the information is already stored in cache memory 24 in exclusive modified state 44, then processor 12 automatically reads the information from cache memory 24. In such a situation, the information remains stored in cache memory 24 in exclusive modified state 44, as indicated by a self-looping "read hit" state transition path 56 at exclusive modified state 44.

Likewise, if a copy of the information is already stored in cache memory 24 in shared state 46, then processor 12 automatically reads the information from cache memory 24. In such a situation, the information remains stored in cache memory 24 in shared state 46, as indicated by a self-looping "read hit" state transition path 58 at shared state 46.

By comparison, if a copy of the information either is not stored in cache memory 24 or is stored in cache memory 24 in invalid state 40, then processor 12 automatically outputs (through system bus 22) a request to copy the information from the addressed portion of memory 16. As another device with a cache memory, processor 14 responds to such a request by snooping cache memory 26 to determine whether cache memory 26 has a copy of information for the addressed portion of memory 16.

If processor 14 has a copy of such information in exclusive modified state 44 (indicating the information is exclusively cached in cache memory 26 and is modified relative to the information actually stored in the addressed portion of memory 16), then processor 14 returns a retry request as discussed further hereinabove in connection with FIG. 1. After processor 14 copies the modified information back to the addressed portion of memory 16, the information remains stored in cache memory 26 in shared state 46, as indicated by a "snoop push due to hit on read" state transition path 60 from exclusive modified state 44 to shared state 46.

Alternatively, if processor 14 has a copy of such information in exclusive unmodified state 42 (indicating the information is exclusively cached in cache memory 26 but is not modified relative to the information actually stored in the addressed portion of memory 16), then processor 14 does not return a retry request. Instead, processor 14 returns a shared status. Also, the information remains stored in cache memory 26 in shared state 46, as indicated by a "snoop hit on a read" state transition path 62 from exclusive unmodified state 42 to shared state 46.

Likewise, if processor 14 has a copy of such information in shared state 46 (indicating the information is also cached in a different cache memory besides cache memory 26 and is not modified relative to the information actually stored in the addressed portion of memory 16), then processor 14 returns a shared status, and the information remains stored in cache memory 26 in shared state 46, as indicated by a self-looping "snoop hit on a read" state transition path 64 at shared state 46.

In response to a shared status returned from processor 14, processor 12 reads the information from memory 16 and stores the information in cache memory 24 in shared state 46, as indicated by a "cache sector fill due to read miss" state transition path 66 from invalid state 40 to shared state 46. By comparison, if no device returns a shared status, then processor 12 reads the information from memory 16 and stores the information in cache memory 24 in exclusive unmodified state 42, as indicated by a "cache sector fill due to read miss" state transition path 68 from invalid state 40 to exclusive unmodified state 42.

As discussed further hereinabove in connection with FIG. 1, if any device returns a retry request, the device that returned the retry request eventually resolves the condition that resulted in the retry request. Then, processor 12 outputs its request to copy information from the addressed portion of memory 16.

Processor 12 is further able to execute a STORE operation to modify information for a portion of memory 16. If a copy of such information is already stored in cache memory 24 in exclusive unmodified state 42, then processor 12 automatically modifies the information in cache memory 24, which is faster than modifying the information in memory 16 through system bus 22. After modifying the information in cache memory 24, the information remains stored in cache memory 24 in exclusive modified state 44, as indicated by a "write hit" state transition path 70 from exclusive unmodified state 42 to exclusive modified state 44.

If a copy of the information is already stored in cache memory 24 in exclusive modified state 44, then processor 12 automatically modifies the information in cache memory 24. In such a situation, the information remains stored in cache memory 24 in exclusive modified state 44, as indicated by a self-looping "write hit" state transition path 72 at exclusive modified state 44.

If a copy of the information is already stored in cache memory 24 in shared state 46, then processor 12 automatically outputs (through system bus 22) a kill request to other devices of system 10. Then, processor 12 modifies the information in cache memory 24, and the information remains stored in cache memory 24 in exclusive modified state 44, as indicated by a "kill due to write hit" state transition path 74 from shared state 46 to exclusive modified state 44.

By comparison, if a copy of the information either is not stored in cache memory 24 or is stored in cache memory 24 in invalid state 40, then processor 12 automatically outputs (through system bus 22) a request to read and modify the information in the portion of memory 16. As another device with a cache memory, processor 14 responds to a request to read and modify (and also to any kill request) by snooping cache memory 26 to determine whether cache memory 26 has a copy of information for the addressed portion of memory 16.

If processor 14 has a copy of such information in exclusive modified state 44, then processor 14 returns a retry request as discussed further hereinabove in connection with FIG. 1. After processor 14 copies the modified information back to the addressed portion of memory 16, processor 14 invalidates the information in cache memory 26, as indicated by a "snoop hit on a write" state transition path 76 from exclusive modified state 44 to invalid state 40.

Alternatively, if processor 14 has a copy of such information in exclusive unmodified state 42, then processor 14 does not return a retry request. Instead, processor 14 invalidates the information in cache memory 26, as indicated by a "snoop hit on a write" state transition path 78 from exclusive unmodified state 42 to invalid state 40.

Likewise, if processor 14 has a copy of such information in shared state 46, then processor 14 invalidates the information in cache memory 26, as indicated by a "snoop hit on a write" state transition path 80 from shared state 46 to invalid state 40.

After processor 12 reads the information from memory 16 with intent to modify, processor 12 modifies the information and stores it in cache memory 24 in exclusive modified state 44, as indicated by a "read with intent to modify" state transition path 82 from invalid state 40 to exclusive modified state 44.

As discussed further hereinabove in connection with FIG. 1, graphics memory 18 is shared by graphics controller 18 and processors 12 and 14. Graphics controller 18 periodically reads information from graphics memory 28. Accordingly, information in graphics memory 28 is subject to modification by processor 12 before graphics controller 18 reads such information.

Without the improvement of the first exemplary embodiment, graphics controller 18 would request information from graphics memory 28 by executing a LOAD operation. If processor 12 had a copy of such information in exclusive modified state 44, then processor 12 would return a retry request. After processor 12 copied the modified information back to the addressed portion of graphics memory 28, the information would remain stored in cache memory 24 in shared state 46, as indicated by state transition path 60. Subsequently, graphics controller 18 would reexecute the LOAD operation and successfully read the information from graphics memory 28.

If processor 12 had a copy of such information in exclusive unmodified state 42, then processor 12 would not return a retry request. Instead, processor 12 would return a shared status. Also, the information would remain stored in cache memory 24 in shared state 46, as indicated by a "snoop hit on a read" state transition path 62 from exclusive unmodified state 42 to shared state 46.

At a later moment, processor 12 could execute a STORE operation to again modify information for graphics memory 28. Since a copy of the information would already be stored in cache memory 24 in shared state 46, processor 12 would automatically output (through system bus 22) a kill request to other devices of system 10. Then, processor 12 would modify the information in cache memory 24, and the information would remain stored in cache memory 24 in exclusive modified state 44, as indicated by state transition path 74.

Significantly, graphics controller 18 does not modify information. Instead, graphics controller 18 outputs signals to display 20 in response to information from graphics memory 28. In order to modify the graphics image displayed by display 20, information in graphics memory 28 is modified by processors 12 and 14.

Accordingly, with the improvement of the first exemplary embodiment, graphics controller 18 requests at least a portion of information from graphics memory 28 by executing a LOAD operation "without intent to cache" the portion of information. Through a signal on control bus 34, graphics controller 18 indicates (to other devices of system 10) its intent to not cache the requested portion of information in a cache memory. If processor 12 has a copy of such information in exclusive modified state 44, then processor 12 returns a retry request. In a significant aspect of the first exemplary embodiment, after processor 12 copies the modified information back to the addressed portion of graphics memory 28, the information remains stored in cache memory 24 in exclusive unmodified state 42 instead of shared state 46. This is indicated by "snoop hit (cache inhibited read)(with copyback)" state transition path 50.

If processor 12 later executes a STORE operation to again modify information for graphics memory 28, a copy of the information is already stored in cache memory 24 in exclusive unmodified state 42. In such a situation, processor 12 does not output a kill request to other devices of system 10, such that traffic through system bus 22 is advantageously diminished by the improvement of the first exemplary embodiment. Instead, processor 12 modifies the information in cache memory 24, and the information remains stored in cache memory 24 in exclusive modified state 44, as indicated by state transition path 70.

In another significant aspect of the first exemplary embodiment, if graphics controller 18 executes a LOAD operation "without intent to cache" for reading information from graphics memory 28, and if processor 12 has a copy of such information in exclusive unmodified state 42, then the information remains stored in cache memory 24 in exclusive unmodified state 42 instead of shared state 46. This is indicated by self-looping "snoop hit (cache inhibited read)" state transition path 52.

Accordingly, if processor 12 later executes a STORE operation to again modify the information, processor 12 does not output a kill request to other devices of system 10. By not outputting a kill request, traffic through system bus 22 is advantageously diminished by the improvement of the first exemplary embodiment.

In summary, in response to graphics controller 18 executing a LOAD operation "without intent to cache", the information remains stored in cache memory 24 in exclusive unmodified state 42 instead of shared state 46. Thus, graphics controller 18 inputs the information without divesting processor 12 of its exclusive ownership of the information. If processor 12 later executes a STORE operation to again modify the information, the information's state changes from exclusive unmodified state 42 to exclusive modified state 44. Since the information is not stored in shared state 46, processor 12 does not output a kill request to other devices of system 10, so that traffic through system bus 22 is advantageously diminished by the improvement of the first exemplary embodiment.

The traffic savings are significant where processor 12 frequently modifies information for graphics memory 28, while graphics controller 18 frequently attempts to read information from graphics memory 28. In such a situation, processor 12 is a "producer" of information, and graphics controller 18 is a "consumer" of the information.

FIG. 3 is a state diagram of a technique for maintaining memory coherency according to a second exemplary embodiment of the present invention. The coherency technique of FIG. 3 is an improved three-state technique. The three states of the state diagram of FIG. 3 are a subset of the MESI states of FIG. 2. Accordingly, FIG. 3 shows invalid state 40, exclusive unmodified state 42, and exclusive modified state 44.

As shown in FIG. 3, shared state 46 of FIG. 2 is not included. Consequently, FIG. 3 shows state transition path 60 leading from exclusive modified state 44 to invalid state 40 rather than to shared state 46. Also, FIG. 3 shows state transition path 62 leading from exclusive unmodified state 42 to invalid state 40 rather than to shared state 46. State transition paths 58, 64, 66, 74 and 80 of FIG. 2 are not included in FIG. 3. Without shared state 46, logic of system 10 is less complex in the second exemplary embodiment, and system 10 is more readily tested.

With the coherency technique of FIG. 3, multiple devices of system 10 do not share ownership of information for a particular portion of memory 16. According to the coherency technique of FIG. 3, the devices of system 10 operate in the same manner as the coherency technique of FIG. 2, except that each LOAD operation is treated as a "read with intent to modify". Consequently, if processor 12 executes either a LOAD operation or a STORE operation, then processor 12 acquires exclusive ownership of information for the addressed portion of memory 16.

Without the improvement of the second exemplary embodiment, graphics controller 18 would request information from graphics memory 28 by executing a LOAD operation. Referring to FIG. 1 and FIG. 3, if processor 12 had a copy of such information in exclusive modified state 44, then processor 12 would return a retry request. After processor 12 copied the modified information back to the addressed portion of graphics memory 28, processor 12 would invalidate the information in cache memory 24, as indicated by state transition path 60 of FIG. 3. Subsequently, graphics controller 18 would reexecute the LOAD operation and successfully read the information from graphics memory 28.

If processor 12 had a copy of such information in exclusive unmodified state 42, then processor 12 would not return a retry request. Moreover, processor 12 would not return a shared status. Instead, processor 12 would invalidate the information in cache memory 24, as indicated by state transition path 62 of FIG. 3.

At a later moment, processor 12 could execute a STORE operation to again modify information for graphics memory 28. Since a copy of the information either would not already be stored in cache memory 24 or would be stored in cache memory 24 in invalid state 40, processor 12 would automatically output (through system bus 22) a request to read and modify the information in graphics memory 28. After reading the information from graphics memory 28 with intent to modify, processor 12 would modify the information and store it in cache memory 24 in exclusive modified state 44, as indicated by state transition path 82 of FIG. 3.

By comparison, with the improvement of the second exemplary embodiment, graphics controller 18 requests at least a portion of information from graphics memory 28 by executing a LOAD operation "without intent to cache" the portion of information. Through a signal on control bus 34, graphics controller 18 indicates (to other devices of system 10) its intent to not cache the requested portion of information in a cache memory. If processor 12 has a copy of such information in exclusive modified state 44, then processor 12 returns a retry request. In a significant aspect of the second exemplary embodiment, after processor 12 copies the modified information back to the addressed portion of graphics memory 28, the information remains stored in cache memory 24 in exclusive unmodified state 42 instead of invalid state 40. This is indicated by state transition path 50 of FIG. 3.

If processor 12 later executes a STORE operation to again modify information for graphics memory 28, a copy of the information is already stored in cache memory 24 in exclusive unmodified state 42. In such a situation, processor 12 does not output a request to read and modify the information in graphics memory 28, such that traffic through system bus 22 is advantageously diminished by the improvement of the second exemplary embodiment. Instead, processor 12 modifies the information in cache memory 24, and the information remains stored in cache memory 24 in exclusive modified state 44, as indicated by state transition path 70 of FIG. 3.

In another significant aspect of the second exemplary embodiment, if graphics controller 18 executes a LOAD operation "without intent to cache" for reading information from graphics memory 28, and if processor 12 has a copy of such information in exclusive unmodified state 42, then the information remains stored in cache memory 24 in exclusive unmodified state 42 instead of invalid state 40. This is indicated by self-looping state transition path 52 of FIG. 3.

Accordingly, if processor 12 later executes a STORE operation to again modify the information, processor 12 does not output a request to read and modify the information in graphics memory 28. Moreover, processor 12 does not reload the information from graphics memory 28. By not reloading the information and not outputting a request to read and modify to other devices of system 10, traffic through system bus 22 is advantageously diminished by the improvement of the second exemplary embodiment.

In summary, in response to graphics controller 18 executing a LOAD operation "without intent to cache", the information remains stored in cache memory 24 in exclusive unmodified state 42 instead of invalid state 40. Thus, graphics controller 18 inputs the information without divesting processor 12 of its exclusive ownership of the information. If processor 12 later executes a STORE operation to again modify the information, the information's state changes from exclusive unmodified state 42 to exclusive modified state 44. Since the information is already stored in cache memory 24, processor 12 does not output a request to read and modify to other devices of system 10; moreover, processor 12 does not reload the information from graphics memory 28.

In this manner, traffic through system bus 22 is advantageously diminished by the improvement of the second exemplary embodiment. The traffic savings are significant where processor 12 frequently modifies information for graphics memory 28, while graphics controller 18 frequently attempts to read information from graphics memory 28. By reducing traffic through system bus 22, overall performance of system 10 is improved.

By enabling a LOAD (or read) operation "without intent to cache", system 10 enables a non-caching consumer device (such as graphics controller 18) to input information without acquiring exclusive ownership or shared ownership of the information. Such a read "without intent to cache" operation can be alternatively referenced as a "cache inhibited read" operation. Such a read operation can be either burst or single beat.

The cache inhibited read (i.e. read with no intent to cache) operation is suitable for use by any consumer device that inputs information without caching or modifying such information. If a consumer device requests information "without intent to cache", then the producer device (such as processor 12) retains exclusive ownership of the information and continues to store the information. If the producer device retains exclusive ownership of the information and continues to store the information, then no additional bus traffic is needed for the producer device to again modify the information.

Although an exemplary embodiment of the present invention and its advantages have been described in detail hereinabove, they have been described as example and not as limitation. Various changes, substitutions and alterations can be made in the exemplary embodiment without departing from the breadth, scope and spirit of the present invention. The breadth, scope and spirit of the present invention should not be limited by the exemplary embodiment, but should be defined only in accordance with the following claims and equivalents thereof.

What is claimed is:

1. A system, comprising:
   a bus for transferring information:
   a first device coupled to said bus for storing said information; and
   a second device coupled to said bus for inputting at least one portion of said information through said bus from said first device and for outputting an indication through said bus of whether said at least one portion is to be cached by said second device.

2. The system of claim 1 and further comprising a third device coupled to said bus for caching said at least one portion.

3. The system of claim 2 wherein said third device caches said at least one portion in an exclusive state.

4. The system of claim 3 wherein said exclusive state is an exclusive modified state.

5. The system of claim 3 wherein said exclusive state is an exclusive unmodified state.

6. The system of claim 3 wherein said third device continues caching said at least one portion in said exclusive state in response to said second device outputting said indication and to said second device inputting said at least one portion, said indication indicating that said at least one portion is not to be cached by said second device.

7. The system of claim 1 wherein said first device is a memory device.

8. A system for maintaining memory coherency, comprising:
   a system bus for transferring information;
   a memory device coupled to said system bus for storing said information;
   a graphics controller coupled to said system bus for inputting at least one portion of said information through said system bus from said memory device and for outputting an indication through said system bus that said at least one portion is not to be cached by said graphics controller; and
   a processor coupled to said system bus and including a cache memory for caching said at least one portion in an exclusive state, said processor continuing to cache said at least one portion in said exclusive state in response to said graphics controller outputting said indication and to said graphics controller inputting said at least one portion.

9. The system of claim 8 wherein said exclusive state is an exclusive modified state.

10. The system of claim 8 wherein said exclusive state is an exclusive unmodified state.

11. The system of claim 8 wherein said cache memory is integral with said processor.

12. A method, comprising the steps of:
   storing information at a first device;
   outputting an indication from a second device of whether at least one portion of said information is to be cached by said second device; and
   using said second device, inputting said at least one portion from said first device.

13. The method of claim 12 and further comprising the step of caching said at least one portion at a third device.

14. The method of claim 13 wherein said step of caching comprises the step of caching said at least one portion in an exclusive state.

15. The method of claim 14 wherein said step of caching comprises the step of caching said at least one portion in an exclusive modified state.

16. The method of claim 14 wherein said step of caching comprises the step of caching said at least one portion in an exclusive unmodified state.

17. The method of claim 14 wherein said step of caching comprises the step of continuing to cache said at least one portion in said exclusive state in response to said second device outputting said indication and to said second device inputting said at least one portion, said indication indicating that said at least one portion is not to be cached by said second device.

* * * * *